E. D. TILLYER.
EYE PROTECTOR.
APPLICATION FILED OCT. 26, 1917.
1,404,668. Patented Jan. 24, 1922.
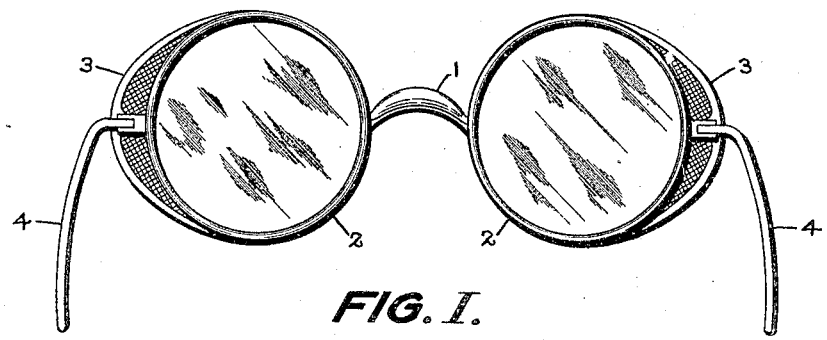
FIG. I.
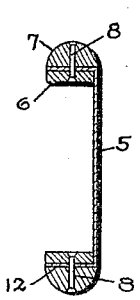 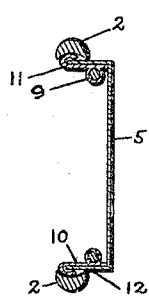 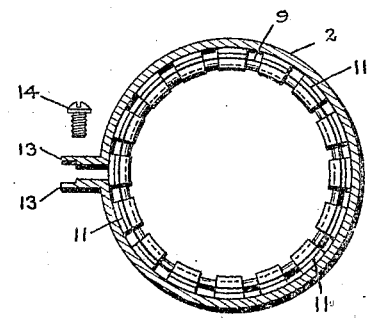
FIG. II.    FIG. III.    FIG. IV.
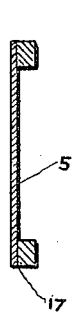 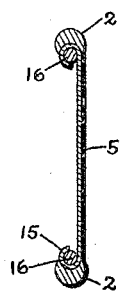 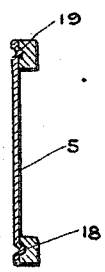
FIG. VI    FIG. V.    FIG. VII
INVENTOR
EDGAR D. TILLYER
BY
H. H. Styll, H. K. Parsons
ATTORNEYS

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE PROTECTOR.

1,404,668.  Specification of Letters Patent.  Patented Jan. 24, 1922.

Application filed October 26, 1917. Serial No. 198,596.

*To all whom it may concern:*

Be it known that I, EDGAR D. TILLYER, a citizen of the United States, residing at Southbridge, in the county of Worcester and State of Massachusetts, have invented certain new and useful Improvements in Eye Protectors, of which the following is a specification.

This invention relates to improvements in eye protectors and has particular reference to a strong and transparent visual member for use in the protector, which will have maximum resistance to flying particles or other impacts thereagainst compatible with the inherent tensile strength of the particular kind of material employed.

A further object of the present invention is the production of a transparent visual device for use in connection with a protector or the like, in which the said visual device shall be at all times held in tension whereby it will be enabled to better resist flying particles and cause the same to rebound rather than pierce the protecting member.

Other objects and advantages of my improved construction should be readily understood by reference to the following specification taken in connection with the accompanying drawings forming a part thereof, and it will be understood that I may make any modifications in the specific details of construction shown and described within the scope of the appended claims without departing from or exceeding the spirit of my invention.

Figure I represents a front view of the mounting embodying my improvements.

Figure II represents a vertical sectional view of one form of my invention.

Figure III represents a similar view of a slightly modified form thereof.

Figure IV represents a view of the construction illustrated in Figure III, with all visual members removed.

Figure V represents a sectional view of another embodiment of my invention.

Figure VI is a vertical sectional view illustrating another slightly modified form of the invention.

Figure VII is a similar view illustrating still another modified form of the invention.

In the drawings, in which similar characters of reference are employed to denote corresponding parts throughout the several views, 1 denotes the bridge of an eye protector, of ordinary or usual construction provided with a lens receiving frame 2 and preferably with a side screen 3 and the temples or other head engaging devices 4 for retaining the protector in position on the face.

Broadly considered one of the principal features of my present invention consists in the employment of a non vitreous transparent visual member in place of the glass or vitreous lens ordinarily employed in the protector. I realize that in the past celluloid or a similar subtsance has been frequently employed as a substitute for glass and has been either thick and held in the frame by clamping the frame around the lens to frictionally retain the lens or held by riveting or cementing the celluloid to the frame. I do not wish to claim this as within the scope of my invention. All of these devices in the past however, so far as I have been able to determine after considerable investigation, have used celluloid or the like in a relatively loose state. The essential feature of my invention consists not in the employment of celluloid, since numerous other compositions may be employed by me for the desired purpose, but in the holding of a selected material under tension so that by this tension the transparent and visual desirablility is enhanced and undesirable wrinkles or the like tending to refract rays of light and interfere with vision are eliminated and a greater resistance power both to penetration and to denting or distortion when struck by flying particles or the like, is secured.

In one form of my invention shown in Fig. II, I have shown this result as accomplished by stretching the material 5 over suitable ring or the like, 6 and securing it in this position by a locking frame 7 of shape to fit the special lens receiving groove of the frame 2. The ring 6 and the locking frame 7 are connected as by rivets or fastenings 8 or the like and insure the retention of member 5 under the proper tension to properly resist impinging particles.

In Figs. III, IV and V I have illustrated another form of my invention in which the member 5 may be readily changed or replaced as desired and in which it may be adjusted by the wearer in accordance with his particular idea of the proper tension. This result I am able to accomplish through employment of the closed rigid ring 9 bearing a series of fingers, each finger having the forward portion 10 disposed on one side of the ring 9 and the beaded portion 11 disposed on the opposite side of the ring 9. The fingers which are mounted upon the ring 9, are preferably arranged for swinging or pivotal movement thereon and at the same time the ends, which project in opposite directions from each side of the ring, are rigidly disposed in alignment with each other. In the employment of this form of my invention I preferably have the member 5 cupped to provide the upstanding peripheral flange 12, which is of sufficient length to extend across the portion 10 of the fingers and rearwardly of the ring 9 into engagement with the beads at the termini of the portion 11. When it is desired to make use of the visual member of this type, it is merely necessary to place the ring 9 with its fingers within the flange of the cup and then insert the complete device within the frame 2, the length of the frame 2 being less than the outside circumference of the flange 12 so that the endpieces 13 will be at all times in spaced relation one to the other brought toward each other by tightening of the connecting screw 14. The parts having been placed in position it is to be noted that one edge of the frame 2 completely engages the rear portion of the flange 12 while the frame 2 also receives the beads of the rear portions 11 of the fingers. Tightening of the screw 14 then increases the clamping action of the edge of the frame against the outer face of the flange and at the same time swings the several fingers as levers drawing the beaded portions 11 together and expanding or swinging outward the portions 10 to place the member 5 under tension, the tension being regulated by tightening of the screw 14, the desired amount.

In Figure V, I have illustrated a simple form of my construction in which the member 5 is formed with the peripheral bead 15, which is adapted to receive the extending wire or ring 16 which is so extended when placed in position as to hold the member 5 tensed, the bead 15 serving both to receive and retain the tension member 16 and also to properly fit the frame 2 so that the visual member may be readily placed in position or removed as desired.

In Figure VI, I have illustrated a form of the invention wherein the material 5 is stretched over a ring 17 and is to be cemented or otherwise secured to one side of this ring. While this form of the invention is extremely simple and appears to be such that the material would be readily removed, it will be understood that the means adapted for securing the material to the ring would be such that it would hold the edges of the material tightly against the ring and prevent any parts of the material from being exposed so that engagement therewith would tend to draw them away from the ring.

In Figure VII, I have illustrated another form of the invention wherein the ring or supporting member 18 is provided with a circumferential groove 19 so that after the material has been placed over the ring, it being understood that cement or other securing adhesive has first been placed upon the ring and material, parts of the material are forced into the groove by having pressure bearing against the material so that it will not only stretch the material across the opening within the ring but will dispose the material in such a position within the groove as to assist the adhesive in retaining the material in its position upon the ring.

From the foregoing description taken in connection with the accompanying drawings the operation and construction of my improved visual member for use in an eye protector should be readily understood and it will be seen that in the several forms of my invention I have provided means for maintaining the transparent non-vitreous visual member under tension, and have thus increased its satisfactory transmission of light and resistance to impact in every instance.

I claim:

1. An eye protector, including a transparent non-vitreous visual device, means peripherally engaging said visual device for holding it under tension, said tension means having a portion to engage a lens receiving groove, and a frame member having a lens receiving groove fitted around and engaging the said portion of the tension device.

2. An eye protector, including a transparent non-vitreous visual member, a supporting member provided with an opening therein and having a circumferential groove therein adapted to receive portions of the visual member for tensioning the same across the opening.

3. The combination with a frame having a lens receiving groove, of a protection member inserted within the groove, including a rigid frame member fitting the groove and a flexible transparent vision member rigidly secured to the frame member and held against flexing thereby.

In testimony whereof I have affixed my signature, in presence of two witnesses.

EDGAR D. TILLYER.

Witnesses:
H. E. COLEMAN,
E. M. LAFLER.